Patented Mar. 13, 1951

2,544,881

UNITED STATES PATENT OFFICE 2,544,881

PREPARATION OF ANHYDROUS SODIUM BETA-NAPHTHOLATE AND CARBONATION THEREOF

Frank J. Hodges, Penns Grove, N. J., and Martin L. Nadler, Wilmington, Del., assignors to E. I. du Pont de Nemours & Company, Wilmington, Del., a corporation of Delaware No Drawing. Application September 13, 1949, Serial No. 115,548

3 Claims. (Cl. 260—520)

1

This invention relates to a new and improved process for the preparation of 2-hydroxy-3-naphthoic acid, which compound is useful as an intermediate for azo dyestuffs.

More particularly this invention relates to an improvement in the preparation of 2-hydroxy-3-naphthoic acid by reaction of sodium-beta-naphthol with caustic soda to form sodium-beta-naphtholate, and further reaction of anhydrous sodium-betanaphtholate with $CO_2$. Still more particularly this invention relates to an improvement in such process by providing for a purified and anhydrous sodium-betanaphtholate as an intermediate in the process.

The established method for the manufacture of 2-hydroxy-3-naphthoic acid involves essentially three distinct stages: preparation of anhydrous sodium-betanaphtholate from beta-naphthol and aqueous caustic soda by vacuum dehydration, "carbonation" of the anhydrous salt with $CO_2$ under pressure at approximately 235° C., and purification of the resulting reaction mass. The end products of manufacture are 2-hydroxy-3-naphthoic acid and recovered betanaphthol which may be reused if desired. The preparation may be represented by the following equations:

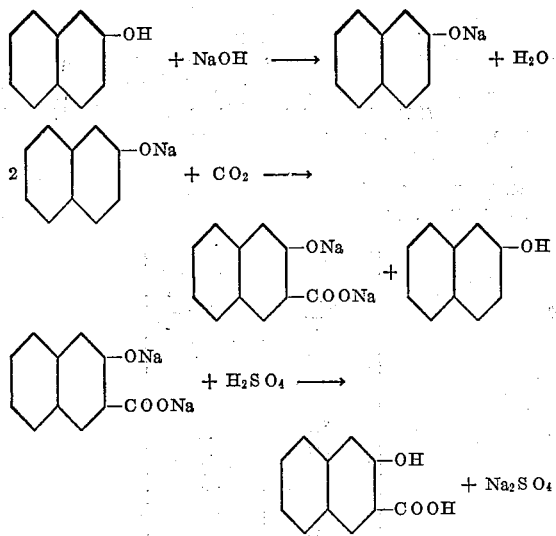

In the above manufacture, however, great difficulties are frequently encountered because tremendous amounts of worthless tars result due to two main causes: oxidation due to leakage of air into the carbonators during the

2 vacuum dehydration, and by-product formation due to side reactions. These side reactions are greatly accelerated by the presence of extremely small amounts of water in the anhydrous naphtholate at the start of the carbonation.

Generally the same manufacturing units known as "carbonators" are used for the dehydration and carbonation stages. The crude product from the carbonators is purified in a series of tanks and filters and then dried. The carbonators are massive and expensive due to the use of pressure carbonation which require autoclave type construction, the need for agitating solid naphtholate to facilitate dehydration, and the heavy power load on the agitation which often occurs when the anhydrous naphtholate fuses on application of $CO_2$ to a heavy, tacky melt which adheres to heat transfer surfaces. The reaction is exothermic and the heat of reaction must be removed from the carbonator since higher temperatures also accelerate tar formation.

The use of the same equipment for both the dehydration and carbonation stages has been determined on the one hand by the need for finely divided naphtholate (such as can be provided by the carbonator agitation) and on the other hand by the difficulty of transferring powdered naphtholate from one vessel to another in view of its high sensitivity to both oxygen and water vapor in air.

It is well known that removal of the last traces of water from a solid is very difficult indeed and it is especially true in this case because the equilibrium vapor pressure of water over the naphtholate is less than 110 mm. Hg at 230° C. which is the final drying temperature. During most of the dehydration cycle the naphtholate is solid and as a result the time required for dehydration is excessively long. In turn, the expensive construction of the carbonator which is used for this long dehydration cycle results in a very high capital investment per unit of production.

Another objection to the present method of operation is based on the fact that the aforementioned difficulties of complete dehydration along with air leakage into the machinery through leaky stuffing boxes and packing glands during the long dehydration cycle all conspire to limit the chemical "conversion" and yield obtained in this process.

A third objection to the present method of manufacture arises from the physical limitation on the size of the charge introduced into the carbonator. The weight of betanaphthol charged to a given carbonator is determined primarily by the volume of naphtholate charged. The water contained in naphtholate made up from 50% aqueous caustic soda is equivalent by weight to over 35% of the anhydrous naphtholate which is later carbonated, and represents equipment capacity which cannot be utilized.

These difficulties have been recognized by earlier workers in this field and various attempts have been made to overcome them.

United States Patent 1,470,039 claims the use of free betanaphthol as a solvent for naphtholate during dehydration and carbonation. When this process was reproduced huge amounts of worthless tar resulted.

United States Patent 1,503,984 of Cone claims a method of dehydration by suspending the aqueous naphtholate in melted paraffin as a means of distilling water out readily. However, experiments have demonstrated that this method produces a naphtholate which is "smeared" with paraffin and will not react with $CO_2$.

United States Patents 2,132,356, 2,132,357 and 2,193,336 of Lecher et al. claim the use of the pyridine and dioxane series of solvents respectively for dehydration of naphtholate. Anhydrous naphtholate is prepared by azeotropic distillation of water from a solution of the aqueous naphtholate in the solvent. The anhydrous naphtholate is soluble in the solvent and the solution is then carbonated under pressure. However, the equipment involved is expensive since the volume of the solvent demands much larger equipment (at least one part solvent per part naphtholate is used) and facilities for solvent recovery are essential for economical operation.

British Patent 460,282 to E. H. Reichenberg is a patent written for the dehydration of naphtholate in an indifferent solvent. Our experiments show that indifferent solvents should be removed before carbonation is attempted for best results and the process therefore involves larger equipment to handle the volume of solvent during dehydration and solvent recovery facilities.

German Patent 740,446 to G. Siegle & Company attempts to surmount the naphtholate dehydration problem by azeotropic distillation of water from a suspension of the naphtholate in an organic solvent followed by carrying the temperature up to 260° C. and carbonating the "resulting molten material" at 260° C. and atmospheric pressure. The example of this patent discusses the use of the potassium salt of betanaphthol which yields isomers other than the desired 2-hydroxy-3-naphthoic acid. The melting point of the sodium salt of betanaphthol is 307° C. which is entirely out of the range of carbonation temperatures since excessive tar formation would result rendering this process essentially unworkable.

Each of the foregoing patents attempted to surmount the problem of dehydration by utilizing a liquid system. However, each of the proposals is inherently uneconomical in terms of either failure to produce the required chemical products by the methods of the examples or the need for excessively large equipment, along with special solvent handling facilities and the cost of their operation.

It is an object of this invention to provide for a new and improved process for producing 2-hydroxy-3-naphthoic acid. A further object is to provide for such a process which gives high yields of 2-hydroxy-3-naphthoic acid without excessive tar and isomer formation. A still further object of this invention is to provide for a simpler and more economical method for assuring complete and rapid dehydration of sodium-betanaphtholate to a product which readily reacts upon carbonation to give a high chemical yield of 2-hydroxy-3-naphthoic acid. A further object of this invention is to dehydrate sodium-betanaphtholate in the absence of solvents so as to increase the productive capacity of a carbonator by increasing the amount of the charge of sodium-betanaphtholate which may be introduced into the carbonator. Further objects will be apparent to those skilled in the art.

These objects, we have discovered, may be accomplished in the process of preparing 2-hydroxy-3-naphthoic acid from betanaphthol by providing for the pure and anhydrous intermediate, sodium-betanaphtholate, by heating aqueous sodium-betanaphtholate in an inert atmosphere (e. g., nitrogen) and in the absence of solvents, at least to its melting point, 307° C., maintaining the sodium-betanaphtholate in the molten state and then reducing the pressure at least below the equilibrium vapor pressure of water over sodium-betanaphtholate until water ceases to be expelled from the molten mass. The point at which the water ceases to be expelled from the mass may easily be determined, for example, by providing for a transparent condenser along the vacuum line from the dehydrating vessel.

The sodium-betanaphtholate is a thin liquid at such a temperature and we have unexpectedly discovered that it remains stable at such temperature in the absence of air and water. It may thus then be transferred in its molten state through heated conduits to the carbonator and there transformed to 2-hydroxy-3-naphthoic acid. If desired, the molten material may be allowed to solidify by cooling in an anhydrous and inert atmosphere (nitrogen), broken into smaller particles and transferred to the carbonator. It is also feasible to flake the molten material under an inert atmosphere and convey a solid to the carbonator.

The minimum dehydration temperature is 307° C., the melting point of pure anhydrous sodium-betanaphtholate. An effective dehydration temperature range is 320° to 333° C., although temperatures as high as 370° C. have been tried without apparent deleterious effect.

Equilibrium vapor pressures of water over the anhydrous sodium-betanaphtholate with respect to temperatures are as follows:

| Temperature, °C. | E. V. P. of Water Over Sodium-betanaphtholate, mm. Hg |
| --- | --- |
| 250 | 120 |
| 300 | 165 |
| 307 | 172 |
| 310 | 175 |
| 315 | 180 |
| 320 | 186 |
| 325 | 189 |
| 330 | 195 |
| 335 | 200 |

As can be seen from the above table, only a moderate vacuum is required to carry out the dehydration; for at 320° C. it is necessary to reduce the pressure merely below 186 mm. Hg which is readily obtainable in commercial equipment.

The molten naphtholate can be manufactured in any suitably heated vessel which need not be equipped with agitation and then stored until required for carbonation or it may be transferred immediately to the carbonator. The carbonator used in the process may be any pressure vessel with sufficient agitation to grind the naphtholate and agitate the mass during carbonation such as a jacketed ball mill. The carbonator is equipped for external heating and cooling. Vacuum, nitrogen, and $CO_2$ connections are provided along with electrically heated pipe for introducing molten naphtholate.

In practice the carbonator is evacuated and the vacuum is released with nitrogen to provide an inert atmosphere. The heated conduit carrying the naphtholate is connected to the carbonator and the carbonator temperature is set at such a level that the final temperature of the ground mass is below 235° C. The molten naphtholate is fed into the carbonator, cooled, ground, reacted with $CO_2$ and the temperature adjusted to 235° C. After reaction is complete the charge is leached out with water and the aqueous mass is worked up by conventional means to 2-hydroxy-3-naphthoic acid and recovered betanaphthol. Alternatively the molten naphtholate is cooled, solidified, and transferred as a solid to the carbonator.

It is common practice in the art to refer to the percentage of betanaphthol converted to 2-hydroxy-3-naphthoic acid as the "conversion." Since, as is shown by the equation above, one mole of betanaphthol is formed along with every mole of 2-hydroxy-3-naphthoic acid, the "yield" is calculated from the sum of the moles of 2-hydroxy-3-naphthoic acid produced plus the moles of butanaphthol recovered, divided by the moles of betanaphthol charged. In practice, the "conversion" is the critical figure since it describes the productivity of the equipment; as the "conversion" rises, generally the yield decreases as a result of the formation of by-products of the reaction.

The following examples are given to demonstrate the advantages of our invention. All parts given are by weight unless otherwise noted.

Example 1

This example demonstrates the conversion, yield, and time cycle of the established method of preparation.

Five hundred and forty (540) parts of betanaphthol, 152 parts of sodium hydroxide and 152 parts of water were mixed under an atmosphere of nitrogen and agitated for one hour at 100° C. Two hundred and fifty-seven (257) parts of the resulting hydrated naphtholate containing 164 parts betanaphthol were transferred to a steel ball mill equipped for external heating and so designed that either vacuum or an atmosphere of $CO_2$ could be applied to the charge and containing steel grinding weights. The charge was heated to 235° C. over nine hours and held under vacuum for 18 hours to dehydrate it. The total dehydration time was 27 hours. After a one-hour cooling period, vacuum was released with carbon dioxide and the charge was heated to 235° C. and held for ten hours under carbon dioxide at 235° C. The charge was then cooled and ground and washed out with water. The aqueous slurry was separated chemically into 2-hydroxy-3-naphthoic acid, recovered betanaphthol and by-product tars. The "conversion" to 2-hydroxy-3-naphthoic acid, M. P. 218.3° C., was 26.1% of theory and the total time cycle in the carbonator was 47 hours. The yield, corrected for betanaphthol recovery, was 79.4%.

Example 2

This example demonstrates the advantages of the time cycle and "conversion" obtained when the naphtholate is dehydrated in the molten state.

Two hundred and forty-two (242) parts of betanaphthol, 68 parts of sodium hydroxide and 140 parts of water were mixed under an atmosphere of nitrogen. The charge was heated to 308° C. in one hour without agitation. Vacuum was applied and the molten naphtholate was completely dehydrated by holding it at 324° C. under a pressure less than 170 mm. Hg for ten minutes. Two hundred and thirty-three (233) parts of the charge containing 201 parts of betanaphthol were transferred under nitrogen to the carbonation vessel of Example 1, and ground for one hour at 235° C. From this point the charge was cooled, treated with carbon dioxide and worked up to finished products as in Example 1. The "conversion" to 2-hydroxy-3-naphthoic acid, M. P. 219.5° C., was 31.8% of theory and the total time cycle in the carbonation vessel was 20 hours. The yield, corrected for betanaphthol recovery, was 74.1%. In this run it will be noted that 201 parts of betanaphthol were carbonated compared to 164 parts in Example 1, though the equipment capacity was the same in each instance.

Example 3

This example is given to demonstrate that the molten naphtholate can be held for long periods in contact with steel without ill effect. A further object is to demonstrate that the size of the charge can be increased by replacing water charged to the carbonator in Example 1 with naphtholate.

Two hundred and forty-two (242) parts of betanaphthol, 68 parts of sodium hydroxide and 140 parts of water were mixed and the charge was dehydrated by the procedure of Example 2 and then held at above 330° C. for 18 hours in the presence of steel without ill effect. Two hundred and forty-three (243) parts of the charge containing 210 parts of betanaphthol were then transferred under nitrogen to the carbonator and handled as in Example 2 from this point on. The "conversion" to 2-hydroxy-3-naphthoic acid, M. P. 219.0° C., was 31.8% of theory. The yield, corrected for betanaphthol recovery, was 79.5%.

As seen from Examples 2 and 3 above, our invention provides a simple and economical system for assuring complete and rapid dehydration of aqueous sodium-betanaphtholate to a product which readily reacts to give a highly satisfactory chemical conversion to 2-hydroxy-3-naphthoic acid and actually increases the productive capacity of a given carbonator by increasing the charge size. Additionally the per cent "conversions" of 2-hydroxy-3-naphthoic acid have been consistently higher by this new method as compared to the conventional process.

What we claim is:

1. The process of producing anhydrous sodium-betanaphtholate formed by the reaction of betanaphthol and aqueous caustic soda comprising gradually heating such reaction product in an inert atmosphere to a temperature of from 307° C. to 370° C. and maintaining the product in a molten state while reducing the pressure at least below the equilibrium vapor pressure until water ceases to be expelled from the molten mass.

2. The process of producing anhydrous sodium-betanaphtholate formed by the reaction of beta-naphthol and aqueous caustic soda comprising gradually heating such reaction product in an inert atmosphere to a temperature of from 320° to 333° C. and maintaining the product in a molten state while reducing the pressure at least below the equilibrium vapor pressure until water ceases to be expelled from the molten mass.

3. The process for producing 2-hydroxy-3-naphthoic acid from sodium-betanaphtholate which comprises gradually heating the sodium-betanaphtholate in an inert atmosphere to temperatures of from 307° to 370° C., maintaining the product in the molten state while reducing the pressure to at least below the equilibrium vapor pressure until water ceases to be expelled from the molten mass, transferring the anhydrous sodium-betanaphtholate while in the molten state to a carbonator, and reacting the same with $CO_2$ at temperatures of approximately 235° C. to produce 2-hydroxy-3-naphthoic acid.

FRANK J. HODGES.
MARTIN L. NADLER.

REFERENCES CITED

The following references are of record in the file of this patent:

UNITED STATES PATENTS

| Number | Name | Date |
|---|---|---|
| 350,468 | Schmitt et al. | Oct. 5, 1886 |
| 1,503,984 | Cone | Aug. 5, 1924 |
| 1,725,394 | Dieterle | Aug. 20, 1929 |
| 1,969,356 | Christiansen et al. | Aug. 7, 1934 |
| 2,084,446 | Lorenz | June 22, 1937 |
| 2,132,356 | Lecher et al. | Oct. 4, 1938 |
| 2,132,357 | Lecher et al. | Oct. 4, 1938 |